US009330097B2

(12) United States Patent
Jain et al.

(10) Patent No.: US 9,330,097 B2
(45) Date of Patent: May 3, 2016

(54) PROJECTS CONTAINING MEDIA DATA OF DIFFERENT TYPES

(75) Inventors: Jhilmil Jain, Mountain View, CA (US); Mohamed E. Dekhil, Santa Clara, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1938 days.

(21) Appl. No.: 12/372,640

(22) Filed: Feb. 17, 2009

(65) Prior Publication Data

US 2010/0211617 A1 Aug. 19, 2010

(51) Int. Cl.
*G06F 17/00* (2006.01)
*G06F 17/30* (2006.01)

(52) U.S. Cl.
CPC ...... *G06F 17/3002* (2013.01); *G06F 17/30038* (2013.01)

(58) Field of Classification Search
CPC . G06F 3/0481; G06F 3/0482; G06F 3/04842; G06F 3/04845; G06F 17/241; G06F 17/30253; G06K 2009/00328; G06K 9/00711
See application file for complete search history.

(56) References Cited

U.S. PATENT DOCUMENTS

| | | | | | |
|---|---|---|---|---|---|
| 5,826,252 | A | * | 10/1998 | Wolters et al. | 717/101 |
| 6,769,094 | B2 | * | 7/2004 | Loesch et al. | 715/203 |
| 7,302,674 | B1 | * | 11/2007 | Gladieux et al. | 717/101 |
| 7,305,392 | B1 | * | 12/2007 | Abrams et al. | 707/770 |
| 7,493,559 | B1 | * | 2/2009 | Wolff | G06F 17/241 715/727 |
| 7,665,022 | B1 | * | 2/2010 | Bednarz, Jr. | 715/721 |
| 2002/0194194 | A1 | * | 12/2002 | Fenton et al. | 707/104.1 |
| 2003/0028598 | A1 | * | 2/2003 | Moller et al. | 709/205 |
| 2003/0195924 | A1 | * | 10/2003 | Franke et al. | 709/203 |
| 2003/0195929 | A1 | * | 10/2003 | Franke et al. | 709/204 |
| 2003/0236839 | A1 | * | 12/2003 | Demsky et al. | 709/205 |
| 2004/0019396 | A1 | * | 1/2004 | McMahon et al. | 700/94 |
| 2004/0158676 | A1 | * | 8/2004 | Kasmirsky | G06F 17/30017 711/117 |
| 2004/0172595 | A1 | * | 9/2004 | Lerner | G06F 3/04883 715/201 |
| 2004/0193594 | A1 | * | 9/2004 | Moore et al. | 707/4 |
| 2004/0215646 | A1 | * | 10/2004 | Kaler et al. | 707/100 |
| 2005/0010864 | A1 | * | 1/2005 | Horikiri et al. | 715/511 |
| 2005/0076058 | A1 | * | 4/2005 | Schwesig | G11B 27/031 |
| 2005/0081159 | A1 | * | 4/2005 | Gupta | G06F 17/22 715/751 |
| 2005/0102324 | A1 | * | 5/2005 | Spring et al. | 707/104.1 |
| 2005/0114784 | A1 | * | 5/2005 | Spring et al. | 715/762 |
| 2007/0162857 | A1 | * | 7/2007 | Weber et al. | 715/731 |
| 2007/0245024 | A1 | * | 10/2007 | Prus | G11B 15/689 709/226 |
| 2009/0006181 | A1 | | 1/2009 | Ghosh et al. | |
| 2009/0155757 | A1 | * | 6/2009 | Gradisar et al. | 434/350 |

FOREIGN PATENT DOCUMENTS

IE  WO 2004043029 A2 * 5/2004 ........ G06F 17/30787

OTHER PUBLICATIONS

"Demo: The Launchpad for Emerging Technology," Demo 09, Mar. 1-3, 2009—Palm Desert, CA, 5 pp. [Online] http://www.demo.com/demonstrators/demo2006/63023.html.
"How to Clip with Google Notebook," Google Notebook, Copyright 2008, 1 p. [Online] http://www.google.com/googlenotebook/videos/clip.html.
"Kaboodle, Frequently Asked Questions," Copyright 2009 Kaboodle Inc., 9 pp. [Online] http://www.kaboodle.com/zd/help/faq.html.
"What is Clipmarks? A Clipmarks Profile and User Review," Copyright 2009 About.com, a part of the New York times Company, 6 pp. [Online] http://www.webtrends.about.com/od/profile1/fr/clipmarks-web20.htm.

* cited by examiner

*Primary Examiner* — Augustine K Obisesan
(74) *Attorney, Agent, or Firm* — Michael A. Dryja

(57) ABSTRACT

A method comprises receiving, across a network at a computing device, media data. The method further comprises determining to which project associated with a user and hosted on the computing device to save the media data. The method further comprises saving the media data to the project. The project is adapted to store media data of different types.

18 Claims, 7 Drawing Sheets

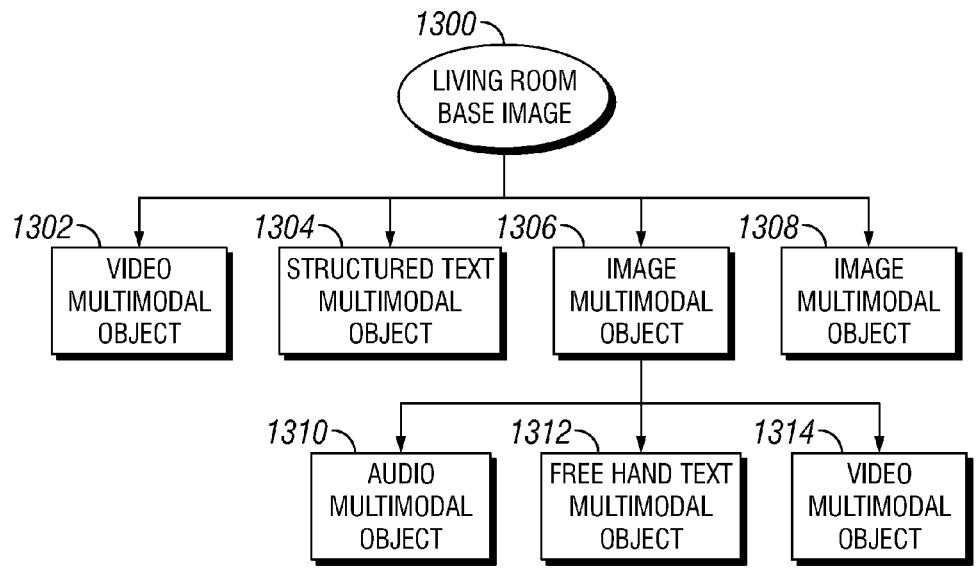
FIG. 13
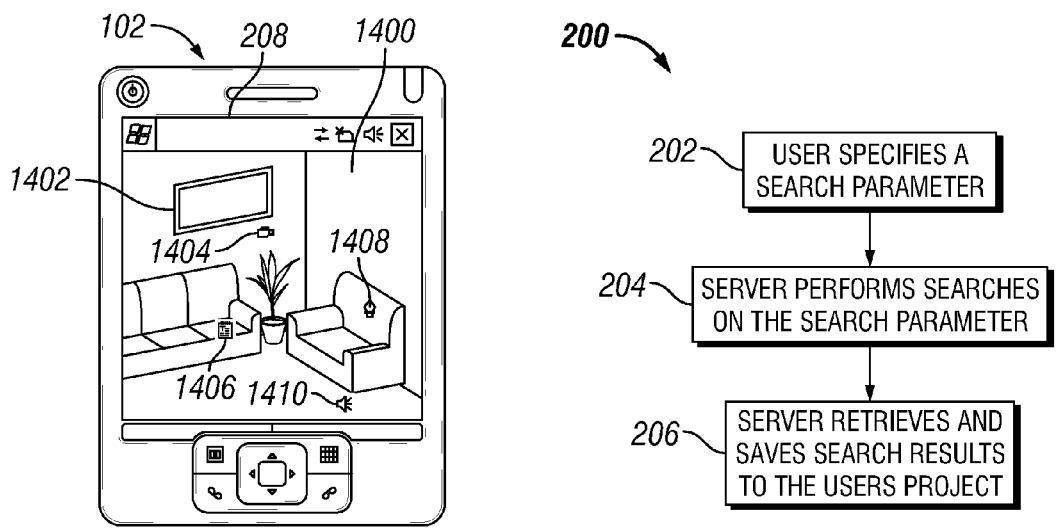
FIG. 14
FIG. 15

PROJECTS CONTAINING MEDIA DATA OF DIFFERENT TYPES

BACKGROUND

Consumers typically undertake multiple projects in parallel—whether it is trip planning, home improvement, or other projects. The desire to efficiently gather, organize and use information to address complex situations is universal. The web and other sources provide unprecedented access to vast amounts of information. A user might want to research, for example, a particular consumer good such as a video camera for a future purchase. The user can research video cameras on-line and in stores. On-line research enables the user to visit many different sites, but managing the information obtained during the research is problematic. A user could print the various websites visited in order to maintain a hard copy of the research, but a user might not always have access to a printer, and at any rate, maintaining a paper file itself can be inconvenient. Further complicating the research is that the user might also visit a store to examine various video cameras in-person. Memorializing the information gleaned during an in person visit and combining that information with the user's on-line research is problematic, as well as having access to on-line data while in the store.

BRIEF DESCRIPTION OF THE DRAWINGS

For a detailed description of exemplary embodiments of the invention, reference will now be made to the accompanying drawings in which:

FIG. 13 is an illustration of an embodiment of a hierarchical data structure representation of an image based project;

FIG. 14 is an illustration of an embodiment of a base image annotated with a plurality of multimodal objects in accordance with various embodiments;

FIG. 15 is another method in accordance with various embodiments; and

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
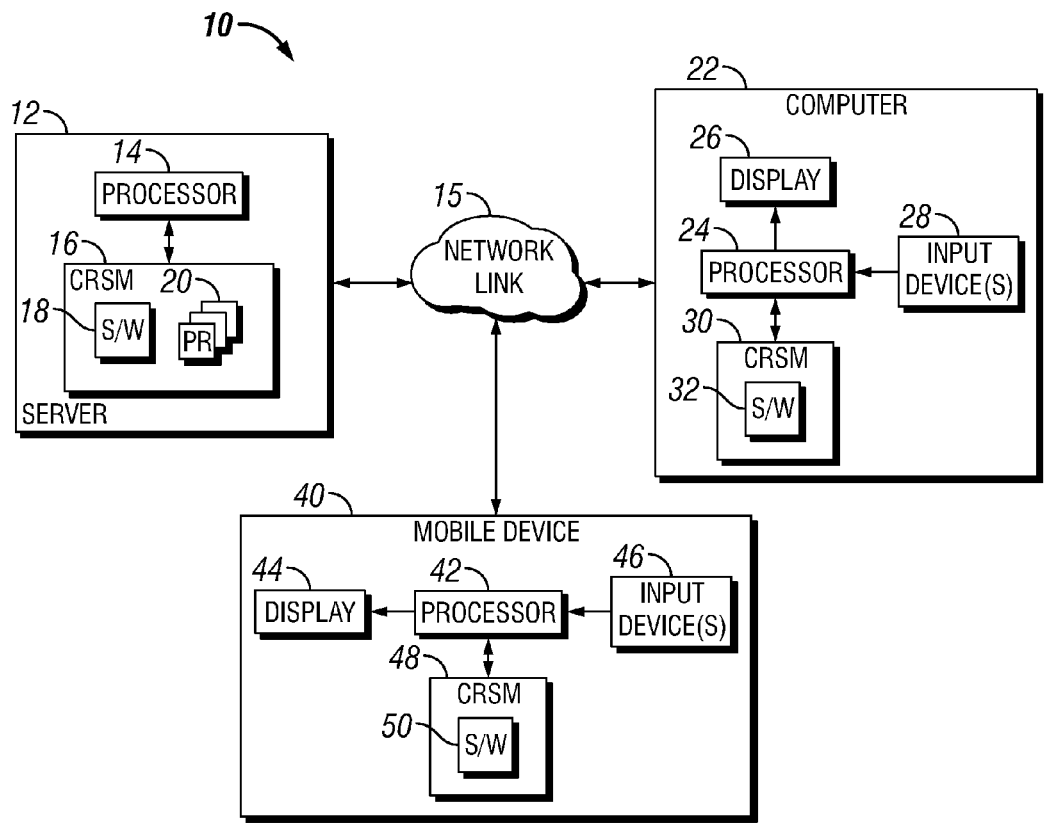
FIG. 1 shows a system in accordance with various embodiments.

FIG. 1 shows a system 10 in accordance with various embodiments. The system 10 comprises various computing devices 12, 22, and 40. In the illustrative system shown, computing device 12 may be a server (and is referred to herein as a server) and is coupled to a local computer 22 and a mobile device 40 via a network 15. The network 15 may comprise a local area network (LAN), a wide area network (WAN), a wired network, a wireless network (e.g., wireless LAN, cellular network, etc.), a combination of wired and wireless network, etc. In some embodiments, the network 15 comprises a combination of the Internet and cellular network.

Computer 22 is referred to as a "local" computer to differentiate it from server 12. The local computer 22 comprises a computer which is used and operated by a user as described herein. The local computer 22 may comprise a desktop computer, notebook computer, etc. The mobile device 40 is also used and operated by the user. The mobile device 40 may comprise a cell phone, personal digital assistant (PDA), or other type of mobile device. In at least some embodiments, the mobile device 40 is equipped with a camera and audio/video recording devices. Accordingly, the mobile device 40 can take still photos and record video and audio clips.

The server 12 comprises a processor 14 coupled to a computer readable storage medium (CRSM) 16. The CRSM 16 contains software 18 that is executed by processor 14. The CRSM 16 also contains storage for one or more projects 20.

Each project is associated with a user, and a user may have and manage multiple projects. Each project is adapted to store media data of different types including text, image, audio, video, etc. The software 18 causes the processor 14 to perform one or more of the actions attributed to the server 12 as described herein. The architecture of the server 12 can be as shown in FIG. 1 or varied as desired.

The local computer 22 comprises a processor 24 coupled to a display 26, one or more input devices 28, and a CRSM 30. The input device 28 comprises any one or more of a keyboard, a mouse, a trackball, etc. The CRSM 30 contains software 32 that is executed by processor 24. The software 32 causes the processor 24 to perform one or more of the actions attributed to the local computer 22 as described herein. In at least some embodiments, at least some of software 32 executed on computer 22 comprises an add-on tool bar for a web browser that runs on the computer 22. The architecture of the local computer 22 can be as shown in FIG. 1 or varied as desired.

The mobile device 40 comprises a processor 42 coupled to a display 44, one or more input devices 46, and a CRSM 48. The input devices 46 comprise any one or more of a keyboard, a mouse, a trackball, a touchpad, etc. The CRSM 48 contains software 50 that is executed by processor 42. The software 50 causes the processor 42 to perform one or more of the actions attributed to the mobile device 40 as described herein. The architecture of the mobile device 40 can be as shown in FIG. 1 or varied as desired.

In accordance with various embodiments, a user of the local computer 22 and/or mobile device 40 creates, manages, and uses projects 20. The user's projects are stored on the server's CRSM 16. Software 32 and 50 on the local computer 22 and mobile device 40, respectively, interact with software 18 on the server to enable the user to create, manage and use the projects, as well as to capture media data to be stored in the server-hosted projects.

The media data captured by a user may comprise any or all of: a portion or all of a web page, a uniform resource locator (URL) for a web page, an audio clip, a video clip, text, graphics, etc. For example, a user, when viewing video cameras on a web page, can highlight a picture of a video camera or an entire advertisement for a video camera of interest and cause that selected portion of the web page to be stored on a select one of the user's projects 20 on the server 12. A user may select a highlight tool from a tool bar to place a highlight box at the desired location and drag a corner of the box to a size so as to select a desired portion of the web page. Once the desired portion is selected, the user may select an icon from the tool bar to save the selected media data to a desired project. The user can select from a list the desired project. Other types of media data can be selected or created as well to save to the project. Thus, a user can create and manage a project that is stored on-line and that can contain disparate types of media data.

The media data to be stored to a given project may be captured using the local computer 22 and/or the mobile device 40. The mobile device 40 may be used, for example, to take a still photograph of a particular item that the user wishes to save to the project. For example, the user may snap a picture of a video camera in an electronics store and cause the picture to be transferred to the server-hosted project of the user's choosing. The user may also use the mobile device 40 to record a voice note to be saved to the project. Other types of media data can be captured as well (e.g., video, text, etc.).

A user can also annotate a media data item. For example, a user can add hand-written text, a voice note, etc. to a still photo captured by the user using the mobile device 40. The annotated photo is then stored in the desired project.

Figure 2:
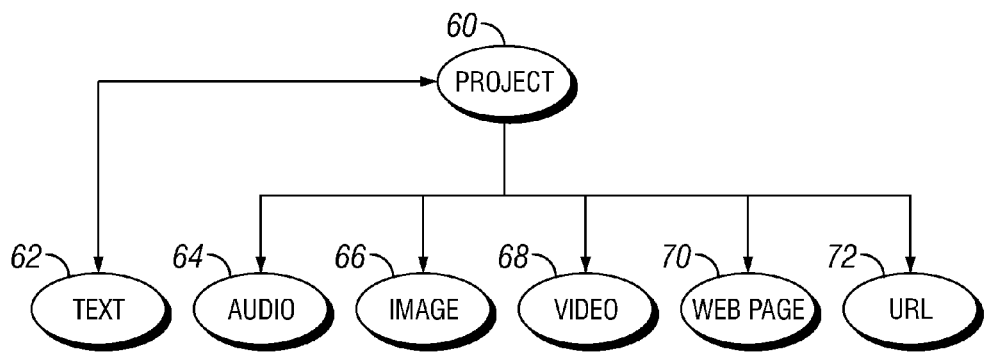
FIG. 2 illustrates the relationship of various media data for a given project in accordance with various embodiments.

FIG. 2 illustrates that a project 60 may contain media data 62-72 of various types. Media data 62 is text data. Media data 64 is audio data. Media data 66-72 is image data, video data, web page data, and URL data, respectively. Other types of media data may be stored as well with a given project.

Figure 3:
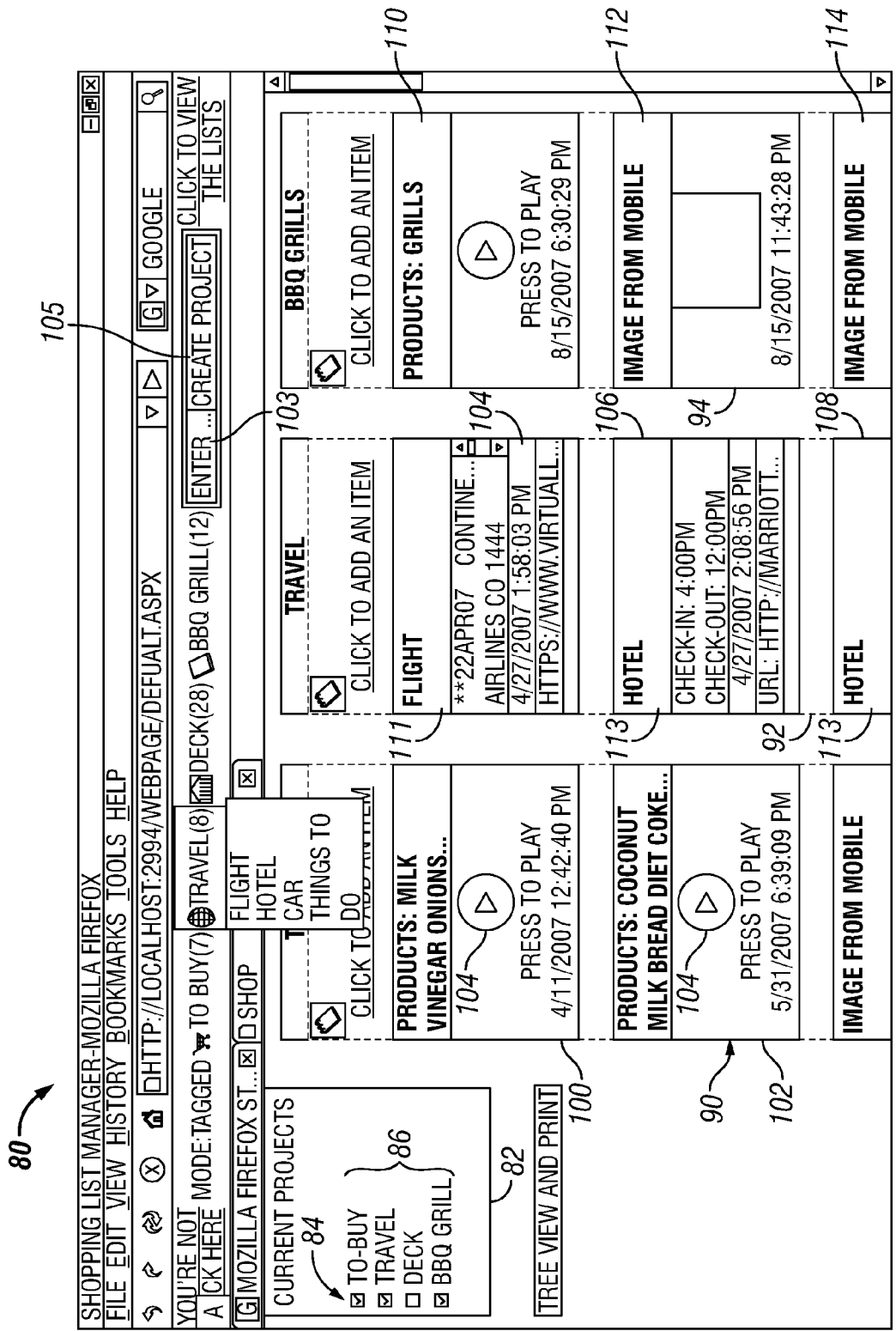
FIG. 3 shows a graphical user interface in accordance with various embodiments.

FIG. 3 illustrates a graphical user interface (GUI) 80 implemented by software 32 on the user's local computer 22. The GUI 80 may be implemented by a web browser. To view and manage the user's projects, the user uses a web browser to navigate to a specified web site at which the user's projects are available. In some embodiments, the user enters a credential (e.g., username and password) to be given access to the user's projects. The GUI 80 comprises a project list 82 of projects that the user has already created. In the example of FIG. 3, the list 82 comprises four projects 86—"To-Buy," "Travel," "Deck," and "BBQ grill." The user created and names these four projects.

The To-Buy project includes a list of items for the user to buy (e.g., a shopping list). The Travel project includes research the user has performed regarding an up-coming vacation (flight information, hotel information, etc.). The Deck project includes information the user has obtained regarding the purchase or repair of a deck. The BBQ grill project includes information about various barbecue grills that the user has obtained.

Each project 86 has an associated check box 84. Clicking a check box (to force a check mark to appear in the box) enables the user to select the particular projects to be displayed on the GUI 80. In the example of FIG. 3, the user has checked the To-Buy, Travel and BBQ grill projects. As a result, those particular projects are shown to the right of the project list 82. The To-Buy project is shown at 90 and the Vacation and BBQ grill projects are shown at 92 and 94, respectively. The title of each project is shown at the top of each project. Included within each project is the various media data or access to the various media.

For example, the To-Buy project 90 includes two voice notes 100 and 102 that were previously recorded via local computer 22 and/or mobile device 40 and saved to server 12. The play buttons 104 within each voice note 100, 102 can be selected (by way of, for example, a mouse click) to cause the associated voice note to be played back to the user. The associated voice note, stored on server 12, is downloaded to the local computer 22 and/or mobile device (collectively referred to herein as "playback devices") and/or streamed to the playback device for playback to the user.

The Travel project 92 contains three items 104, 106, and 108 of media data. Media data item 104 contains flight information. Media data items 106 and 108 contain hotel information. The user previously captured information about two different hotels and saved each piece of hotel media information to the Travel project—hence, two separate items pertaining to hotel information.

The BBQ project 94 contains three items 110, 112, and 114 of media data. Media data item 110 comprises an audio or video note recorded by the user using a capture device 22, 40. Each of the media data items 112 and 114 comprises an image taken by, for example, the mobile device 40 (although the images could have been taken by the local computer 22).

Figure 4:
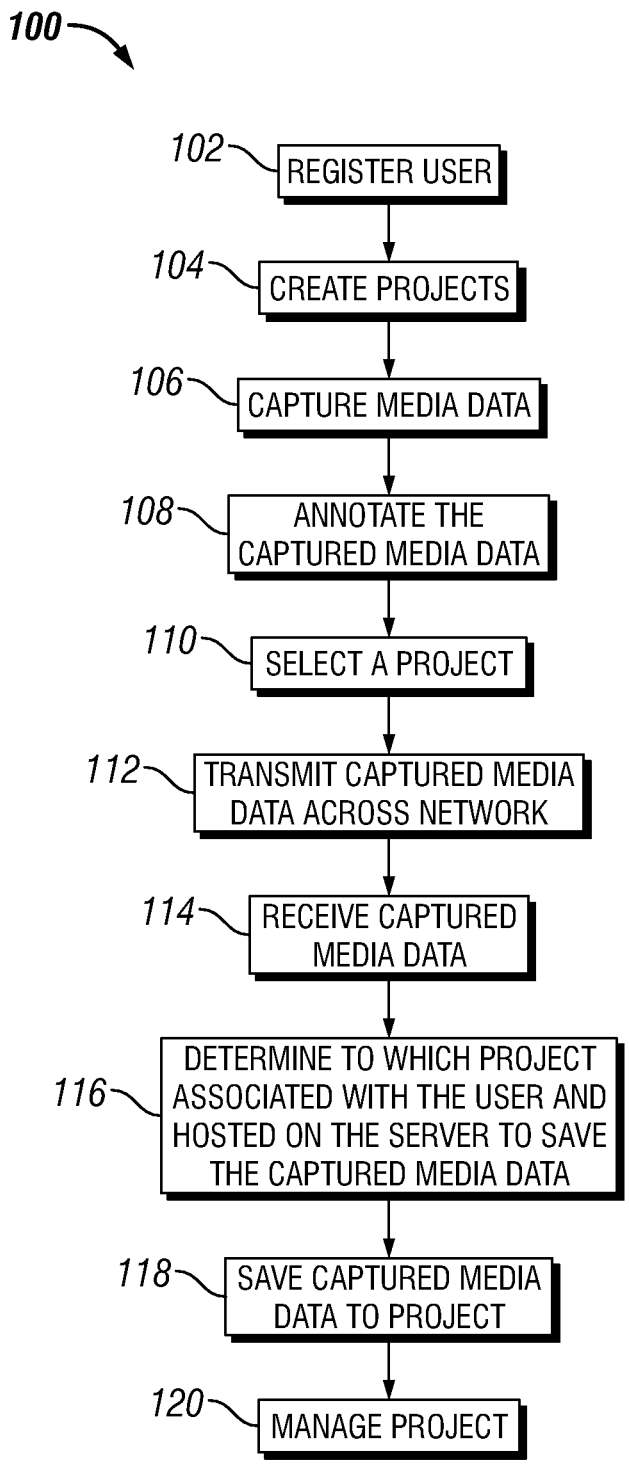
FIG. 4 shows a method in accordance with various embodiments.

FIG. 4 shows a method 100 in accordance with various embodiments. The illustrative method 100 comprises various actions 102-120 which may be performed in an order different from that shown in FIG. 4. Two or more of the actions may be performed in parallel as is appropriate and desired. Further, some of the actions are performed by a capture device (e.g., local computer 22, mobile device 40) and other actions are performed by the server 12. Some actions are performed through a cooperative communication between the server 12 and capture device 22, 40.

At 102, the user registers with the service hosted on the server 12 by using his or her web browser to access a URL associated with the on-line service. The user registers once. The registration process may include the user providing various demographic information such as name, mailing address, email address, etc., as well as billing information such as a credit card number in the event the on-line project-hosting service requires the user to pay a fee.

At 104, the user creates one or more projects. Creating a project may include typing a title for a project to be created in field 103 (FIG. 3) clicking a "create project" button 105. The newly created project will be added to the project list 82.

A project may include a template. A template may include names for various types of media data to be included in the project. For example, most travel projects include flight and hotel information. Thus, a template for a travel project may be populated with the subcategories flight and hotel as shown at 111 and 113, respectively in FIG. 3. The flight subcategory can be selected by a user when saving captured media data pertaining to flight information to a travel project. In some embodiments, the user can select a predetermined template to be associated with the newly created project. For example, if the user wishes to create a travel project for an upcoming vacation, the user can create the project name as noted above, and also select from a list of templates the "travel" template. The user can edit and modify the predetermined template to rename a subcategory as well as to create a new template altogether.

Referring still to FIG. 4, method 100 further comprises at 106 the user using the capture device to capture media data while, for example, viewing information on a website or seeing a physical object in a store. The capture of the media data may be the entire web page, a portion of the web page, the URL associated with the web page of interest, a photograph of an object, an audio (e.g., voice) recording, a video recording, text, etc.

At 108, the user may annotate the captured media data. Annotating the captured media data is explained below. At 110, the user uses his capture device 22, 40 to select a project to which to save the captured media data. The user's web browser may include an option from a drop down menu or a tool bar to prompt the user to specify the particular project that the user desires to save to, from among possibly multiple projects associated with that user. The user may be presented with a list of titles of the user's various projects created thus far and the user clicks on the desired project title.

Once the user has selected the desired project, at 112, the capture device transmits the captured media data to the server 12 and indicates to the server to which project to save the captured media data. The capture device 22, 40 may send an Internet Protocol (IP) packet which also contains the target project title to the server 12. Alternatively, the capture device 22, 40 may generate and send an email message to the server. Such an email message may include the captured media data as an attachment or embedded in the body of the email message itself. The project title may be included in the subject line of the email message. The capture device 22, 40 also specifies to the server 12 enough information to enable the server to determine the user to which the media data is associated. In some embodiments, the message (IP packet, email message, etc.) from the capture device 22, 40 may include a unique identifier of the capture device (e.g., IP address, serial number, etc.), the user's name, as well as, if necessary or desired, the user's credentials for verification (e.g., username and password). The user may be prompted for such credentials, for example, when attempting to save the captured media data to the server.

At 112, the captured media data is transmitted across network 115 by the capture device 22, 40 to the server 12. At 114, the server 12 receives the captured media data. At 116, the server 12 processes (e.g., parses) the incoming message to determine to which project being hosted on the server to save the associated media data. The server 12 may make this determination in at least some embodiments by retrieving a project title from the message sent by the capture device. If so configured, the server 12 may also verify the user's credentials. At 118, the server 12 saves the captured media data to the specified project. If the user had selected a subcategory (e.g., flight information) when selecting a project to which to save the captured media data, the server 12 saves the captured media data under the specified subcategory. The subcategory name may also be included in the message sent by the capture device 22, 40 that contains the captured media data.

At 120, the user can manage his or her projects. Project management includes one or more of various actions. One such project management action is project creation as explained above regarding action 104. Other project management functions include printing some or all of the contents of a project, editing the contents of the project, further annotating the contents of the project, viewing the contents of a project, deleting a project, and organizing projects, etc. Organizing projects may include re-ordering media data within a project, moving or copying media data items from one project to another, etc.

Figure 5:
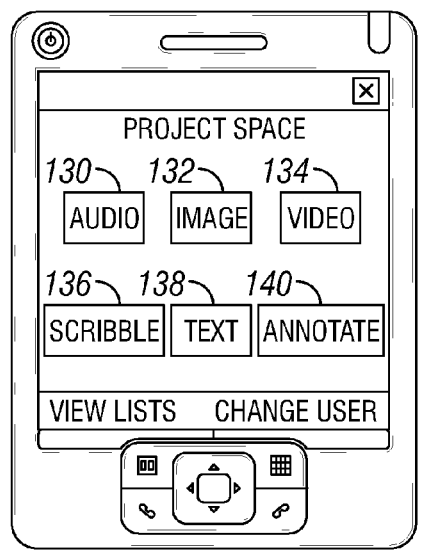
FIG. 5 illustrates a graphical user interface on a mobile device in accordance with various embodiments.

As noted above, after capturing a piece of media data, the user may desire to annotate the captured media data. FIG. 5 illustrates the various functions that can be performed on a capture device 22, 40 (a mobile device 40 is shown in this example) in accordance with various embodiments. The displayed functions are implemented in software 50 that executes on the mobile device 40. The displayed functions include recording an audio note 130, taking a still image 132, recording video 134 (with or without audio), providing free-form handwriting 136, typing text 138, and annotating 140 another piece of captured media data. This latter function, media data annotation, is discussed below. The annotation function permits a user to tag additional media data to an existing piece of media data. For example, a user can add a voice note to a picture that the user took. A user could handwrite some text or type some text on a picture. More than one annotation can be entered and tagged on a given piece of media data (referred to below as "base image." The various types of annotations that can be added to the base image are referred to herein as "multimodal objects" indicating that the annotation data can be of varying types (text, audio, video, etc.) and/or can be different than the base image itself.

Figure 6:
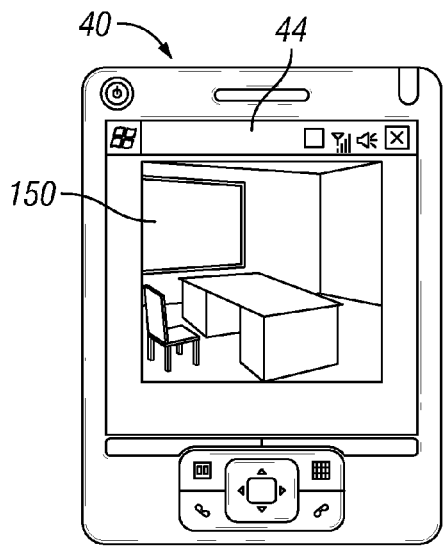
FIG. 6 illustrates a base image displayed on the display of a mobile device in accordance with various embodiments.

Referring to FIG. 6, an illustration of one example of a base image 150 displayed on the display 44 of one embodiment of a mobile device 40 is shown. The mobile device's software 50 coordinates the annotation of the base image with one or more multimodal objects captured using the mobile device 40. In one embodiment, the user selects an area of the base image for annotation with a multimodal object thereby generating a user annotation request. The user annotation request is received by the mobile device's software 50. In one embodiment, display 44 is a touch-sensitive screen and the user selects an area of the base image for annotation by tapping on the selected area of the base image displayed on the display 44. In one embodiment, a cursor is used to select an area of the base image for annotation. Alternative mechanisms for selecting an area of a base image displayed on a display 44 may be used as well.

The base image can be annotated using a number of different types of multimodal objects as noted above. Examples of different types of multimodal objects include, but are not limited, images, video, audio recordings, barcodes, structured text, free hand text, and free hand sketches. The user selects the multimodal object type that the user wishes to use to annotate the base image.

In various embodiments, the software 50 displays a multimodal object type selection menu on the display 44 responsive to the receipt of a user annotation request. In one embodiment, the multimodal object type selection menu lists the different types of multimodal objects that can be captured at the mobile device 40. In one embodiment, the multimodal object type selection menu lists the mechanisms available for capturing multimodal objects at the mobile device 40. In one embodiment, the multimodal object type selection menu lists the multimodal object types that can be captured at the mobile device 40 and/or mechanisms available for capturing different types of multimodal objects at the mobile device 40. The user selects a multimodal object type from the multimodal object type selection menu.

Figure 7:
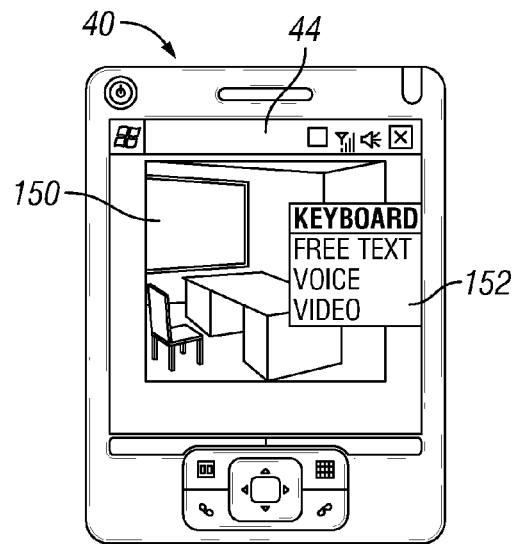
FIG. 7 is an illustration of a multimodal object type selection menu displayed on the display the mobile device in accordance with various embodiments.
Figure 8A:
FIGS. 8(a)-(d) are illustrations of different multimodal object type gestures in accordance with various embodiments.
Figure 8B:
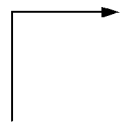
Figure 8C:
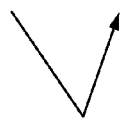
Figure 8D:
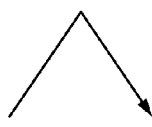

Referring to FIG. 7, an illustration of a multimodal object type selection menu 152 displayed on the display 44 of the mobile device 40 is shown. The multimodal object type selection menu 152 lists keyboard, free text, voice, and video as user selectable options. Selecting keyboard enables the user to annotate the base image 150 using structured text. Selecting free text enables the user to annotate the base image 150 using free hand text. Selecting voice enables the user to annotate the base image 150 using an audio recording. One example of an audio recording is a recording of the user voice. Selecting video enables the user to annotate the base image 150 using video.

In one embodiment, the software 50 supports the use of a gesture-based user interface mechanism to select a multimodal object type. More specifically, the software 50 recognizes a plurality of different multimodal object type gestures, where each of the different multimodal object type gestures is associated with a specific type of multimodal object. The user enters a multimodal object type selection by entering the multimodal object type gesture associated with the selected multimodal object type via a touch-sensitive display 44 and the multimodal object type selected by the user is determined by software 50.

Referring to FIGS. 8(*a*) through (*d*), examples of a plurality of different multimodal object type gestures that are recognized in accordance with at least some embodiments are shown. The multimodal object type gesture illustrated in FIG. 8(*a*) is recognized by software 50 as a selection of structured text as the multimodal object type. The multimodal object type gesture illustrated in FIG. 8(*b*) is recognized by software 50 as a selection of free hand text as the multimodal object type. The multimodal object type gesture illustrated in FIG. 8(*c*) is recognized by software 50 as a selection of audio recording as the multimodal object type. The multimodal object type gesture illustrated in FIG. 8(*d*) is recognized by software 50 as a selection of video as the multimodal object type. While examples of a number of different multimodal object type gestures have been described, alternative forms of gestures may be used to initiate the capture of different types of multimodal objects at the mobile device 40.

The software 50 displays a multimodal object type specific user interface associated with the multimodal object type selected by the user on the display 44. The multimodal object type specific user interface guides the user through the steps to capture the desired multimodal object. The software 50 displays a multimodal object type icon in the area of the base image that has been selected for annotation by the user. The specific multimodal object used to annotate the selected area of the base image is associated with the multimodal object type icon displayed in the selected area of the base image. Upon the selection of a specific multimodal object type icon displayed on the base image, the software 50 responsively retrieves the multimodal object associated with the selected multimodal object type icon and renders the retrieved multimodal object at the mobile device 40. In one embodiment, the user is provided with the option of editing the rendered multimodal object.

Figure 9:
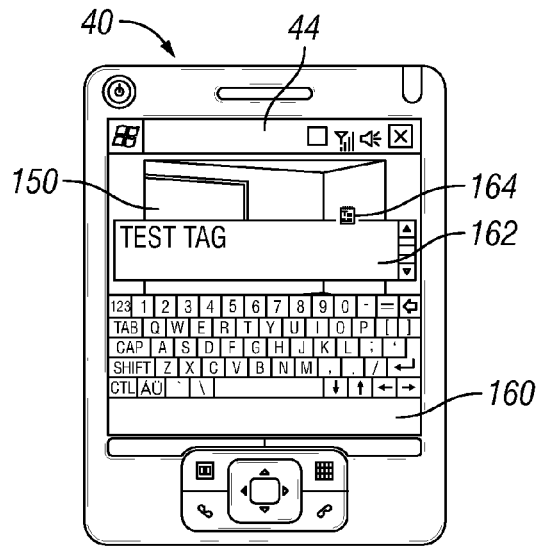
FIG. 9 is an illustration of an embodiment of a multimodal object type specific user interface associated with the selection of structured text as the multimodal object type in accordance with various embodiments.

Referring to FIG. 9, an illustration of an embodiment of a multimodal object type specific user interface associated with the selection of structured text as the multimodal object type is shown. The multimodal object type specific user interface associated with the selection of structured text as the multimodal object type is displayed on the display 44 and includes a keyboard display 160 and a structured text display field 162. The display 44 may comprise a touch-sensitive screen as noted above, and the user utilizes the displayed keyboard 160 to enter the structured text annotation. The text entered by the user via the keyboard 160 is displayed in the text display field 162. A structured text icon 164 is displayed in the area of the base image 150 that has been selected for annotation by the user. Upon selection of the structured text icon 164 by the user, a structured text display field 162 with the structured text multimodal object associated with the selected structured text icon 164 is generated. The user is provided with the option of editing the structured text displayed in the structure text display field 162.

Figure 10:
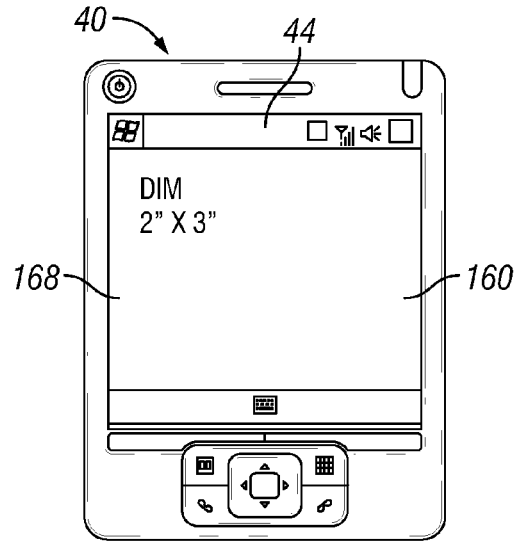
FIG. 10 is an illustration of an embodiment of a multimodal object type specific user interface associated with the selection of free hand text as the multimodal object type in accordance with various embodiments.

Referring to FIG. 10, an illustration of an embodiment of a multimodal object type specific user interface associated with the selection of free hand text as the multimodal object type is shown. The multimodal object type specific user interface associated with the selection of free hand text as the multimodal object type is displayed on the display 44 and includes a free hand text display field 1000. The display 44 is a touch-sensitive screen and the user utilizes the free hand text display field 160 to enter the free hand text annotation. A free hand text icon (not shown) is displayed in the area of the base image 150 that has been selected for annotation by the user. Upon selection of the free hand text icon by the user, a free hand text display field 168 with the free hand text multimodal object associated with the selected free hand text icon (not shown) is generated. The user is provided with the option of editing the free hand text displayed in the free hand text display field 168.

Figure 11:
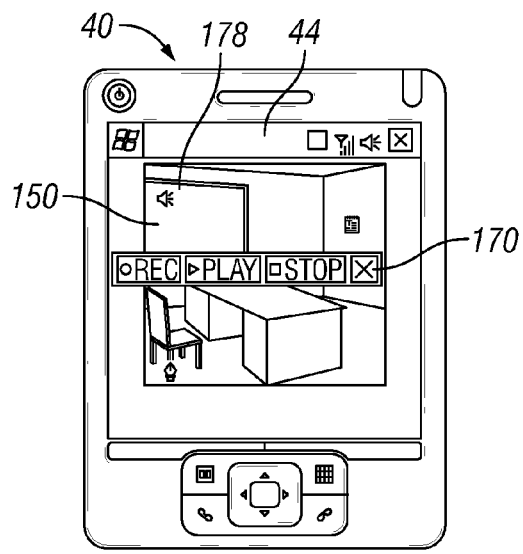
FIG. 11 is an illustration of an embodiment of a multimodal object type specific user interface associated with the selection of an audio recording as the multimodal object type in accordance with various embodiments.

Referring to FIG. 11, an illustration of an embodiment of a multimodal object type specific user interface associated with the selection of an audio recording as the multimodal object type is shown. The multimodal object type specific user interface associated with the selection of audio recording as the multimodal object type is displayed on the display 44 and includes an audio recording control panel 170. The display 44 is a touch-sensitive screen and the user utilizes the displayed audio recording control panel 170 to record the audio annotation. More specifically, the audio recording control panel 170 includes a record button, a play button and a stop button. Selecting the play button initiates recording of the audio annotation, selecting the stop button stops the audio recording process, and selecting the play button enables the user to preview the recorded audio annotation. An audio recording icon 178 is displayed in the area of the base image 150 that has been selected for annotation by the user. Upon selection of the audio recording icon 178 by the user, the audio recording associated with the selected audio recording icon 178 is generated. The user is provided with the option of editing the audio recording. For example, the user may rerecord or append the audio recording.

Figure 12:
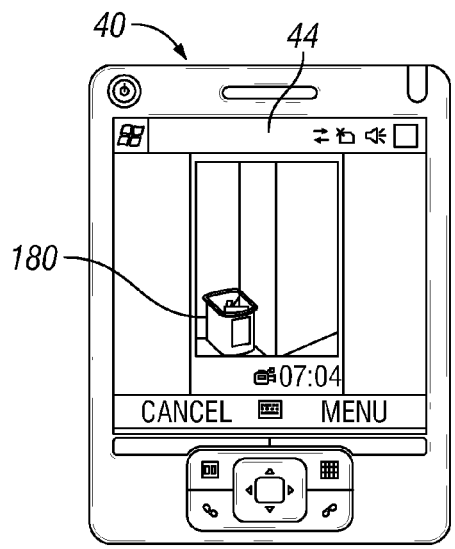
FIG. 12 is an illustration of an embodiment of a multimodal object type specific user interface associated with the selection of video as the multimodal object type in accordance with various embodiments in accordance with various embodiments.

Referring to FIG. 12, an illustration of an embodiment of a multimodal object type specific user interface associated with the selection of video as the multimodal object type is shown. The multimodal object type specific user interface associated with the selection of video as the multimodal object type is displayed on the display 44 and includes video display field 180. The video annotation is displayed in the video display screen 180 as the video annotation is being recorded. A video icon (not shown) is displayed in the area of the base image 600 that has been selected for annotation by the user. Upon selection of the video icon by the user, a video display field 180 is generated and the video multimodal object associated with the selected video icon is played in the video display field 180. The user is provided with the option of editing the video recording. For example, the user may re-record or append the video recording.

The captured multimodal object is received by software 50. The software 50 tags the received multimodal object with object specific metadata. In one embodiment, the software 50 tags the received multimodal object with the user selected area of the base image. In one embodiment, the software 50 tags the received multimodal object with the coordinates of the selected area of the base image. In one embodiment, the software 50 tags the received multimodal object with one or more of a time stamp, a global positioning system (GPS) coordinate, and a mobile device identifier. While a number of different object specific metadata tags have been described, it should be noted that other forms of object specific metadata tags may also be used to tag the received multimodal object. In one embodiment, the user is provided with the option of performing intelligent searches of the multimodal objects using the object specific metadata tags.

The software 50 incorporates the captured multimodal object into the image based project. In one embodiment, an image based project is stored using a hierarchical data structure with the multimodal annotations being stored as objects of the associated base image.

Referring to FIG. 13, an illustration of an embodiment of a hierarchical data structure representation of an image based project is shown. The image based project is a living room decoration project. The living room decoration project includes a living room image 1300. The living room image 1300 has been designated a base image by user. The living room image 1300 has been annotated using a first plurality of multimodal objects. More specifically, the living room image 1300 has been annotated with a video multimodal object 1302, a structured text multimodal object 1304, and two image multimodal objects 1306, 1308. The image multimodal object 1306 has been designated as a base image by the user and annotated with a second plurality of multimodal objects. More specifically, the image 1306 has been annotated with an audio multimodal object 1310, a free hand text multimodal object 1312, and a video multimodal object 1314. Each object in the hierarchical data structure includes object specific metadata. The base image objects include base image specific metadata and the multimodal objects include multimodal object specific metadata. As illustrated in this example, image multimodal objects may also be annotated using additional multimodal objects. The living room decoration project may also include non-annotation objects. For example, a coupon associated with the purchase of an item for placement in the living room may be incorporated into the hierarchical data structure as a non-annotation object. In one embodiment, a non-annotation object is associated with a project. In one embodiment, a non-annotation object is associated with a base image. In one embodiment, a non-annotation object is associated with a multimodal object.

Referring to FIG. 14, an illustration of an example of a base image 1400 annotated with a plurality of multimodal objects is shown. The base image 1400 is an image of a living room. Each of the multimodal annotations 1404, 1406, 1408, 1410 is typically associated with a specific area of the base image 1400. Each of the multimodal annotations is typically represented by a multimodal object type icon 1404, 1406, 1408, 1410 identifying the type of the multimodal annotation. More specifically, the displayed base image 1400 has been annotated with a video multimodal object as indicated by the video icon 1404, a structured text multimodal object as indicated by the structured text icon 1406, a free hand text multimodal object as indicated by the free hand text icon 1408, and an audio multimodal object as indicated by the audio icon 1410. The location of each multimodal object type icon 1404, 1406, 1408, 1410 on the base image 1400 identifies the specific area of the base image 1400 annotated using the multimodal object associated with the specific multimodal object type icon 1404, 1406, 1408, 1410. In this example, the free hand sketching annotation 1402 is overlaid over the base image 1400 is not represented by a multimodal object type icon. Selection of any one of the multimodal object type icons 1404, 1406, 1408, 1410 results in the rendering of the multimodal object associated with the selected multimodal object type icon.

FIG. 15 illustrates a method 200 in accordance with various embodiments by which a user causes the capture device 22, 40 and server 12 to interact to automatically perform on-line searches at the request of the user based on a search parameter provided by the user. For example, a user, interested in video cameras, may provide the system a particular make and model number of a particular video camera being considered by the user. Rather than the user visiting various websites himself, capturing relevant information associated with the video camera and storing such information in the user's video camera project, the system will automatically access various predetermined websites for, in this case, product reviews based on the make/model number. Upon finding a relevant product review, the system will then download the review to the user's video camera project. The user only enters the search parameter and the title of the project to which the search pertains and the system does the rest. The capture device's software 32, 50 prompts the user for the search parameter and transmits that search parameter to the server 12. The server's software 18 receives the search parameter and, without further user involvement, performs the search and stores the search results in the relevant project 20. The websites automatically accessed by the server may be previously specified by the user.

The search can be manually initiated by a user entering the search parameter and clicking on a "start" (or equivalent) button. Alternatively, the search can be made to occur periodically (so updated information can be obtained) or each time the user logs into the on-line project service hosted on the server 12. The searched information can be of a variety of types, including, but not limited to, reviews, features, prices, product information, etc.

The illustrative method 200 of FIG. 15 comprises actions 202-206. At 202, the user specifies the search parameter. At 204, the server 12 performs the search based on the search parameter provided by the user. At 206, the server retrieves and stores the search results to the user's specified project.

In accordance with some embodiments, a user can share one or more of his projects with other people. A project can be shared via a social networking website. Providing others access to a user's project enables the user to receive comments and feedback about the project and its contents. For example, the user may want feedback on brands and features of a barbecue grill and he may have already captured and added various barbecue grill types to his project. The user can chose to share the entire project or a subset with his friends and family and they can either leave comments and their preferences, or use tools such as voting/rating to provide feedback.

Once the user has manually (from the webpage or mobile device) and/or automatically (the service does search on the user's behalf) collected information, the various embodiments provide mechanisms such as drag-and-drop (within or across projects) to organize information in projects, edit collected information, copy/paste, etc. A user can also tag information and create multi-level hierarchies within a single project.

Figure 16:
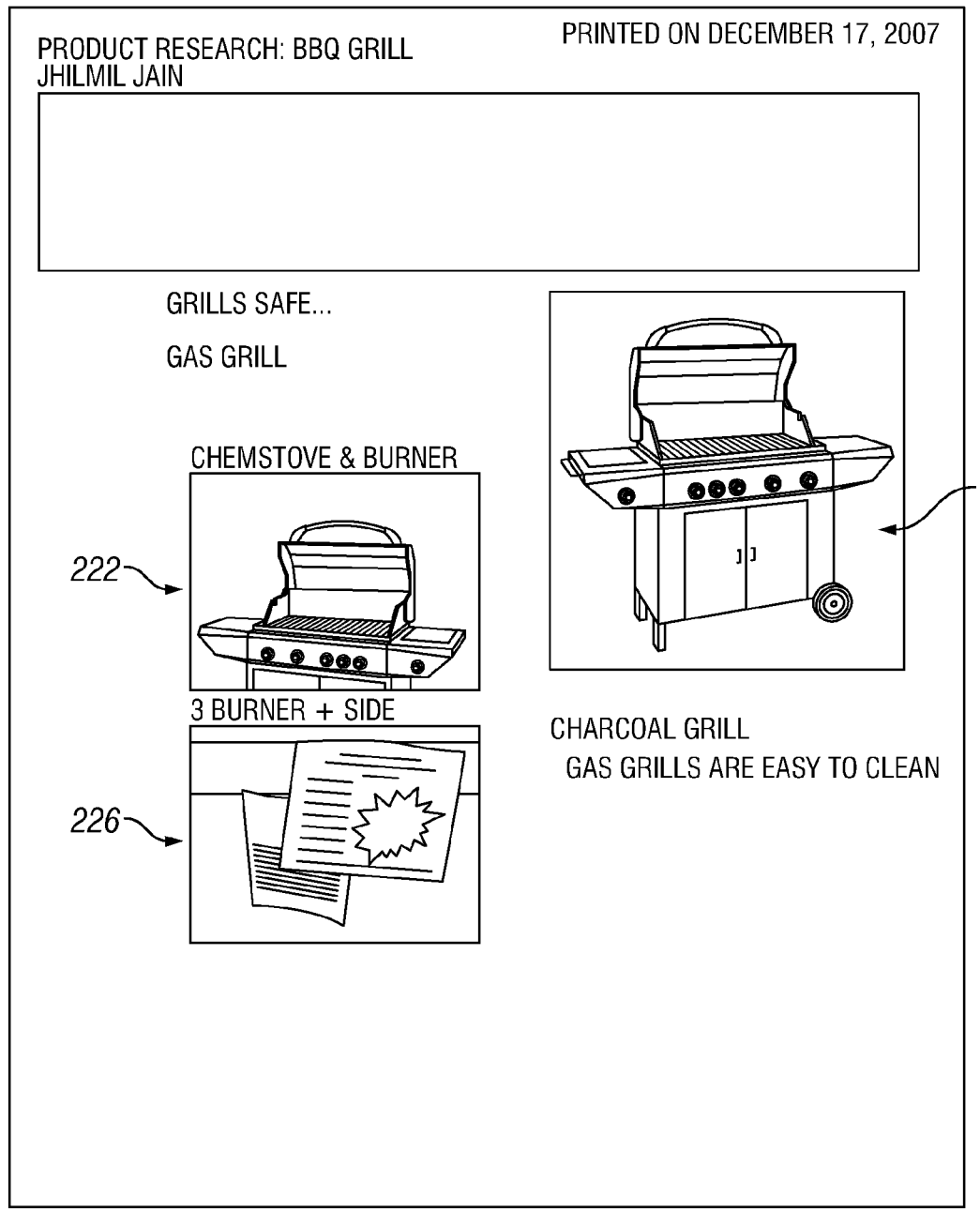
FIG. 16 illustrates an example of a published project in accordance with various embodiments.

A project can also be published and a published project can be, for example, printed or shared (see above). FIG. 16 shows an example of a project publication 220. Various items, but not necessarily all, of the project have been selected for publication. Each item in a project may include a checkbox. Checking that box causes the associated item to be selected for publication. Item 222, for example, is an example of keywords extracted from a voice note (e.g., a voice note dictated by a user or other person). Item 224 is an example of information that has automatically been retrieved as explained above. Item 226 is an example of an image and text that has bee obtained from a webpage. A project can be published in any of a variety of formats such as a web page format, Microsoft Word document, PDF, etc. The user can select the desired publication format from, for example, a drop-down menu. The published document includes multimodal data (e.g., audio, video, annotated media, text, images, etc.).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer readable storage medium containing an executable program that, when executed by a processor, causes the processor to:
   capture, as specified by a user, media data;
   select, as specified by a user, a project from among a plurality of projects hosted on an on-line service, each project adapted to store media data of different types,
   transmit said captured media data to said on-line service for storing in said selected project;
   select a portion of said media data; and
   generate an annotation for said portion,
   wherein said media data comprises an image and the executable program causes the processor to display a graphic symbol pertaining to the annotation on the image, the graphic symbol being selectable by the user to be presented with the annotation.

2. The non-transitory computer readable storage medium of claim 1, wherein said captured media data is of a media type that differs from said annotation.

3. The non-transitory computer readable storage medium of claim 1, wherein said processor and computer readable medium are provided in a mobile device having cellular communication capability.

4. The non-transitory computer readable storage medium of claim 1, wherein said executable program causes the processor to publish said project in any of a plurality of selectable formats.

5. The non-transitory computer readable storage medium of claim 1, wherein said executable program causes the processor to share at least some of said project with another user.

6. The non-transitory computer readable storage medium of claim 1, wherein said executable program causes the processor to receive and save comments about said project from another user.

7. A non-transitory computer readable storage medium containing an executable program that, when executed by a processor, causes the processor to:
   capture, as specified by a user, media data;
   select, as specified by a user, a project from among a plurality of projects hosted on an on-line service, each project adapted to store media data of different types;
   transmit said captured media data to said on-line service for storing in said selected project;
   select a portion of said media data; and generate an annotation for said portion, wherein said executable program causes the processor to generate one of a plurality of types of annotation based on a user gesture on a touch sensitive display, a different user gesture associated with each of the plurality of types of annotations.

8. The non-transitory computer readable storage medium of claim 7, wherein said captured media data is of a media type that differs from said annotation.

9. The non-transitory computer readable storage medium of claim 7, wherein said processor and computer readable medium are provided in a mobile device having cellular communication capability.

10. The non-transitory computer readable storage medium of claim 7, wherein said executable program causes the processor to publish said project in any of a plurality of selectable formats.

11. The non-transitory computer readable storage medium of claim 7, wherein said executable program causes the processor to share at least some of said project with another user.

12. The non-transitory computer readable storage medium of claim 7, wherein said executable program causes the processor to receive and save comments about said project from another user.

13. A method comprising:
   capturing, by a processor, as specified by a user, media data;
   selecting, by the processor, as specified by a user, a project from among a plurality of projects hosted on an on-line service, each project adapted to store media data of different types;
   transmit said captured media data to said on-line service for storing in said selected project;
   selecting, by the processor, a portion of said media data; and
   generating, by the processor, an annotation for said portion, wherein one or more of:
      said media data comprises an image and the executable program causes the processor to display a graphic symbol pertaining to the annotation on the image, the graphic symbol being selectable by the user to be presented with the annotation;
      the method further comprises generating one of a plurality of types of annotation based on a user gesture on a touch sensitive display, a different user gesture associated with each of the plurality of types of annotations.

14. The method of claim 13, wherein said captured media data is of a media type that differs from said annotation.

15. The method of claim 13, wherein said processor is provided in a mobile device having cellular communication capability.

16. The method of claim 13, further comprising publishing said project in any of a plurality of selectable formats.

17. The method of claim 13, further comprising sharing at least some of said project with another user.

18. The method of claim 13, further comprising receiving and saving comments about said project from another user.

* * * * *